Jan. 10, 1950 R. S. KING 2,494,179
DETACHABLE ILLUMINATED CARD HOLDER
Filed Nov. 10, 1948
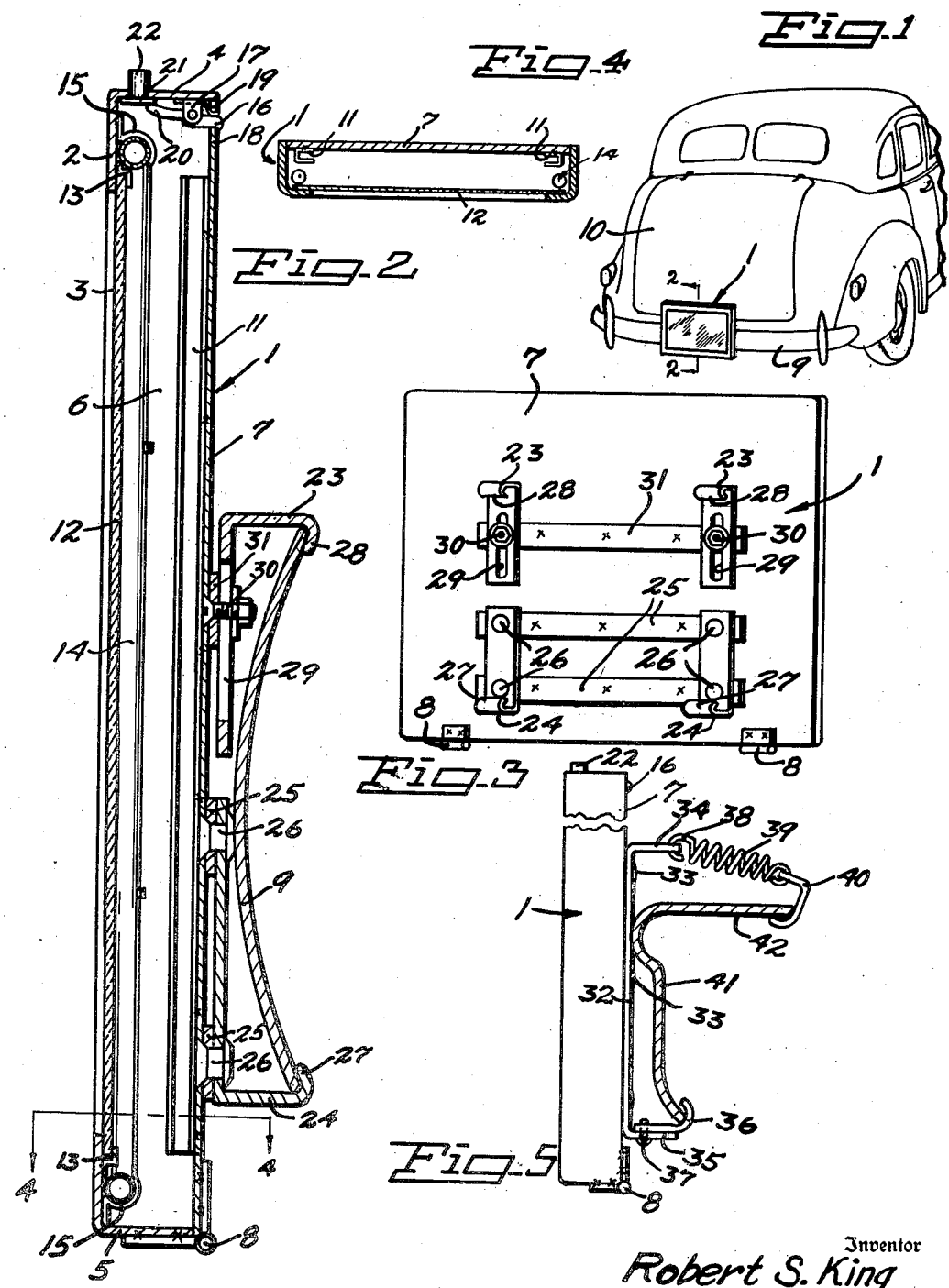
Inventor
Robert S. King
By
Glenn L. Fish
Attorney Patented Jan. 10, 1950

2,494,179

UNITED STATES PATENT OFFICE 2,494,179

DETACHABLE ILLUMINATED CARD HOLDER

Robert S. King, Bonners Ferry, Idaho

Application November 10, 1948, Serial No. 59,240

4 Claims. (Cl. 40—134.1)

This invention relates to a card or plate holder and it is one object of the invention to provide a holder of this character which is adapted to be mounted upon a bumper of an automobile and hold a license plate or advertising card in position where it may be easily seen and read.

Another object of the invention is to provide a holder consisting of a frame formed with a sight opening through its front wall which is closed by a transparent sheet, the sight opening being surrounded by a lighting tube which is disposed within the frame or box where it will be shielded from accidental damage by stones thrown up from a road when the automobile to which the frame is attached is in motion.

Another object of the invention is to provide a holder having a hinged connection between its bottom and the lower edge of its rear wall so that the frame may be swung downwardly when a sign or license plate is to be inserted or removed, a latch being provided at the top of the frame for holding the frame in an upright and closed position.

Another object of the invention is to provide the frame or box with improved clamping means carried by its rear wall and by means of which the frame is firmly secured to the bumper of an automobile.

Another object of the invention is to provide a sign or plate holder which is of simple construction and easy to apply to or remove from the bumper of an automobile.

The invention is illustrated in the accompanying drawings wherein:

Fig. 1 is a perspective view showing the improved card holder mounted upon the rear bumper of an automobile.

Fig. 2 is a sectional view upon an enlarged scale taken vertically through the card holder along the line 2—2 of Figure 1.

Fig. 3 is a perspective view looking at the outer face of the rear wall of the card holder.

Fig. 4 is a transverse sectional view taken horizontally through the sign holder along the line 4—4 of Figure 2.

Fig. 5 is a side view of a card holder having a modified form or clamp for holding it to the bumper of an automobile.

This improved card or plate holder has a body which may be termed a box or frame and is indicated in general by the number 1. This box or frame has a front wall 2 formed with a large opening 3, top and bottom walls 4 and 5, and walls 6, and a rear wall 7. The rear wall is connected with the bottom wall by hinges 8 and when the frame is mounted upon the bumper 9 of an automobile 10 it may be swung outwardly and downwardly to an opened position and a card or license plate readily thrust downwardly into retainer strips 11 formed of channel metal and firmly mounted upright against the inner surface of the rear wall. A card or license plate so mounted will be clearly visible through the sight opening 3 which is closed by a transparent sheet 12 disposed against the inner surface of the front wall and held in place by a suitable number of clamps 13. A lighting tube 14 is secured against the front wall in surrounding relation to the sight opening and the glass panel 12 by a suitable number of clamps 15 and when lighted illuminates the interior of the box or frame so that the card or license plate may be seen at night. Except when inserting or removing a card or license plate the frame is to be held in its upright or closed position and in order to do so there has been provided a latch 16 which is pivoted to a bracket 17 carried by the top wall 4 and projects rearwardly therefrom in position for passing through an opening 18 formed in the rear wall near the upper edge thereof. A spring 19 urges the latch downwardly but allows it to be shifted upwardly during closing of the box or frame and when the frame is closed the bill of the latch engaged across the lower edge of the opening and securely holds it closed. The handle or arm 20 of the latch extends forwardly in the frame and its front end bears against the head 21 at the lower end of a push button 22 which is mounted vertically through an opening in the top wall of the frame and when this button is pressed downwardly the latch will be tilted to a releasing position and allow the frame to be swung downwardly to its opened position.

The card holder is to be firmly mounted upon the bumper of the automobile and in order to do so there have been provided clamps carried by the rear wall. These clamps are arranged in pairs and each pair consists of an upper clamp 23 and a lower clamp 24. The lower clamps are rigid clamps and are mounted vertically against cross strips 25 by rivets 26 which pass through the rear wall and have their heads flush with the inner surface thereof so that they will not interfere with insertion of a card or license plate into the retainer strips 11. The bill 27 of the lower clamps project outwardly from the rear wall for engaging across the lower edge of the bumper and the upper clamps also have outwardly projecting bills 28 for engaging across the upper edge of the bumper. The upper clamps 23 are disposed vertically over their companion lower clamps 24 and are formed with longitudinally extending slots 29 to receive bolts 30 which are mounted through opposite ends of a cross bar 31, and from an inspection of Figure 2 it will be seen that after the lower clamps have been engaged under the lower edge of the bumper the upper clamps may be disposed over the bumper and then shifted downwardly until their bills 28 are in clamping engagement therewith. The nuts of the bolts 30 are then tightened and the bumper will be firmly gripped between the upper and lower clamps and the box or frame securely held in the position shown in Figure 1. The card or license plate in the frame will then be visible through the transparent plate and can not become jolted loose and lost as it is confined within the frame or box. When the card or license plate is to be removed and another inserted it is merely necessary to press upon the button 22 to release the latch and the frame may be swung downwardly to its opened position. The card or license plate is then drawn upwardly out of engagement with the tracks or mounting strips 11 and the new one inserted.

Instead of providing the box or frame with the clamps shown in Figures 2 and 3 it may be provided with attaching means shown in Figure 5. In this embodiment of the invention there have been provided a pair of brackets 32 which are mounted vertically against opposite side portions of the rear or outer face of the rear wall by rivets 33. Arms 34 and 35 extend from upper and lower ends of the brackets and the lower arms each carry a clamp 36 which is connected therewith by a screw 37, the upper arm being formed with an opening in which is engaged the hook 38 at one end of a helical spring 39. This spring has its other end connected with a clamp 40. The clamps shown in Figure 5 are particularly adapted for use in connection with a bumper 41 having a flange or lip 42 along its upper edge and when the bills of the lower clamps are engaged across the lower edge of the bumper and the upper clamps engaged with the free edge of the lip the springs 39 will be stretched and placed under such tension that pull will be exerted and the upper and lower clamps held in tight gripping engagement with the bumper.

Having thus described the invention, what is claimed is:

1. A card holder comprising a frame open at its back and having a front wall formed with a sight opening, a transparent closure sheet for the sight opening, a lighting tube mounted against the inner face of the front wall about the transparent sheet, a rear wall for said frame hinged to the lower portion of the frame and mounting the frame for tilting movement outwardly and downwardly to an opened position, strips of channeled material mounted vertically against side edge portions of the inner face of the rear wall and constituting mounting members for a card to be displayed through the sight opening, the upper edge portion of the rear wall being formed with an opening, a latch pivotally mounted in said frame and having a rearwardly extending bill for passing through the opening and releasably securing the frame in its closed position, said latch being urged downwardly and having a forwardly extending arm, a push button slidable vertically through an opening at the top of the frame and having a head at its lower end limiting its upward movements and resting upon the latch arm for forcing the arm and swinging the latch upwardly to a releasing position when downward pressure is applied to the button, and clamps carried by the rear wall for engaging a bumper of an automobile and detachably mounting the card holder thereon.

2. A card holder comprising a frame having a front wall formed with a sight opening, and a rear wall, means for supporting a card in the frame in position to be viewed through the sight opening, cross bars mounted horizontally against the outer surface of the rear wall, and upper and lower clamps mounted vertically against the cross bars, the lower clamps being rigidly mounted and having bills at their lower ends projecting from the rear wall in position for engaging across the lower edge of an automobile bumper, and the upper clamps being shiftable vertically to adjusted positions and having bills extending from the rear wall for engaging across the upper edge of the bumper and cooperating with the bills of the lower clamps to detachably hold the card holder to the bumper.

3. A card holder comprising a frame having a front wall formed with a sight opening, and a rear wall, means for supporting a card in the frame in position to be viewed through the sight opening, cross bars mounted horizontally against the outer surface of the rear wall, and upper and lower clamps mounted vertically against the cross bars, the lower clamps being rigidly mounted and having bills at their lower ends projecting from the rear wall in position for engaging across the lower edge of an automobile bumper, and the upper clamps being formed with vertically extending slots through which pass bolts carried by the upper cross bar and serving to releasably secure the upper clamps in position for engaging across the upper edge of the bumper and cooperating with the lower clamps to detachably secure the card holder to the bumper.

4. A card holder comprising a frame having a front wall formed with a sight opening, and a rear wall, means for supporting a card in the frame in position to be viewed through the sight opening, cross bars mounted horizontally against the outer surface of the rear wall, brackets mounted vertically against the outer face of the rear wall in transverse spaced relation to each other, and having upper and lower arms projecting rearwardly therefrom, clamps carried by the lower arms and projecting rearwardly therefrom and having upwardly projecting bills for engaging the lower edge of an automobile bumper, springs carried by the upper arms for extending rearwardly therefrom, and clamps at rear ends of the springs having downwardly extending bills for engaging across the upper edge of the bumper and holding the springs under tension to cause the upper and lower clamps to grip the bumper and detachably secure the card holder against the bumper.

ROBERT S. KING.

REFERENCES CITED

The following references are of record in the file of this patent:

UNITED STATES PATENTS

| Number | Name | Date |
| --- | --- | --- |
| 1,847,605 | Fitzgerald | Mar. 1, 1932 |
| 1,987,943 | Munson | July 15, 1935 |
| 2,104,230 | Kiss | Jan. 4, 1938 |
| 2,134,594 | Andelenis | Oct. 25, 1938 |
| 2,211,135 | Kuenning | Aug. 13, 1940 |